United States Patent [19]

Prokai et al.

[11] 3,943,156

[45] Mar. 9, 1976

[54] CYANO-ETHER POLYALKYLSILOXANE HYDRIDES

[75] Inventors: Bela Prokai, Mahopac; Bernard Kanner, West Nyack, both of N.Y.

[73] Assignee: Union Carbide Corporation, New York, N.Y.

[22] Filed: Dec. 27, 1974

[21] Appl. No.: 536,874

[52] U.S. Cl. 260/448.2 N; 260/2.5 R; 260/2.5 AM; 260/448.2 B; 260/448.2 H; 260/448.8 R
[51] Int. Cl.² ..... C07F 7/04; C07F 7/10; C07F 7/18
[58] Field of Search .............. 260/448.2 N, 448.8 R

[56] References Cited
UNITED STATES PATENTS

| | | | |
|---|---|---|---|
| 2,872,435 | 2/1959 | Speier | 260/448.2 N X |
| 3,168,544 | 2/1965 | Jex | 260/448.2 N |
| 3,185,663 | 5/1965 | Prober | 260/448.2 N X |
| 3,185,719 | 5/1965 | Prober | 260/448.2 N |
| 3,544,615 | 12/1970 | Poppelsdorf | 260/448.2 N X |
| 3,560,549 | 2/1971 | Poppelsdorf | 260/448.2 N X |
| 3,629,309 | 12/1971 | Bailey et al. | 260/448.8 R X |

*Primary Examiner*—Paul F. Shaver
*Attorney, Agent, or Firm*—Marylin Klosty

[57] ABSTRACT

Cyano-ether polyalkylsiloxane hydrides are provided which comprise monofunctional siloxy units and difunctional siloxy units, an average of between about 2 and about 100 silicon-bonded cyano-bearing ether groups for every two moles of monofunctional units, said cyano-bearing ether groups having the formula, $-(O)_q R'OR''CN$, wherein $q$ is zero or one, $R'$ is bivalent alkylene of 3 to 8 carbon atoms and $R''$ is bivalent alkylene of 2 to 4 carbon atoms, and an average of between about 2 and about 30 silicon-bonded hydrogen atoms for every two moles of monofunctional units, said monofunctional units having at least two alkyls bonded to the respective silicon atoms thereof and the difunctional units having at least one alkyl bonded to the respective silicon atoms thereof, the remaining group bonded to silicon of the respective monofunctional and difunctional siloxy units being alkyl, said cyano-bearing ether group or hydrogen. The polyalkylsiloxane hydrides of the invention are especially useful as hydrosilation and condensation agents in the formation of corresponding cyanoalkoxyalkyl- and cyanoalkoxyalkoxy-substituted polyalkylsiloxane-polyoxyalkylene copolymers.

29 Claims, No Drawings

CYANO-ETHER POLYALKYLSILOXANE HYDRIDES

BACKGROUND OF THE INVENTION

The present invention relates to a particular class of cyano-bearing polyalkylsiloxane hydrides.

Our copending application Ser. No. 536,884, filed 12/27/74, entitled, "Organosilicone Polymers and Polyester Urethane Foam Produced Therewith," describes and claims a particular class of cyano-bearing polyalkylsiloxane-polyoxyalkylene copolymers and their use as foam stabilizers of flexible polyurethane foam derived from a polyester polyol. Our copending application Ser. No. 536,885, also filed 12/27/74, entitled, "Organosilicone Polymers and Polyether Urethane Foam Produced Therewith" describes another particular class of cyano-bearing polyalkylsiloxane-polyoxyalkylene copolymers and their use as foam stabilizers of flexible poly-urethane foam derived from a polyether polyol. In the copolymer compositions of each of said copending applications, the cyano-bearing substituent is cyanoalkoxyalkyl and/or cyanoalkoxyalkoxy. Such copolymers are prepared by various methods. One general method comprises the reaction between corresponding cyanoalkoxyalkyl- and cyanoalkoxy-alkoxy-substituted polyalkylsiloxane hydrides and poly-oxyalkylene reactants which at one end are either hydroxyl-terminated or endblocked by an olefinically unsaturated group. The present invention is drawn to said cyano-substituted polyalkylsiloxane hydrides, their preparation and their utility, particularly in forming the aforesaid respective classes of copolymers.

SUMMARY OF THE INVENTION

In accordance with one aspect of the present invention, a particular class of cyano-substituted polyalkylsiloxane hydrides are provided which contain chemically combined monofunctional siloxy units ($M_o$) and difunctional siloxy units ($D_o$), an average of from about 2 to about 100 silicon-bonded cyano-bearing ether groups (Q) and an average of from about 2 to about 30 silicon-bonded hydrogen atoms for every two moles of monofunctional siloxy units ($M_o$) contained in the polymer, the remaining silicon-bonded groups being alkyl (R). As indicated, the essential silicon-bonded cyano-bearing ether groups are collectively referred to herein by the symbol "Q" and have the formula, —(O)$_q$—R'OR''—CN, where $q$ is zero or one, R' is bivalent alkylene having from 3 to 8 carbon atoms, and R'' is bivalent alkylene having from 2 to 4 carbon atoms. Thus, when $q$ is zero, Q is cyanoalkoxyalkyl (that is, NC—R''O—R'—) and, when $q$ is one, Q is cyanoalkoxyalkoxy (that is, NC—R''O—R'O— ). In either case, the cyano substituent is bonded to carbon of the alkylene ether group, —R''OR'—, which is in contrast to the composition of the respective cyano-bearing polyalkylsiloxane hydrides described and claimed in our U.S. Pat. No. 3,846,462 and in our copending application Ser. No. 457,510, filed Apr. 3, 1974. In the hydrides of said patent and application, cyano is present as silicon-bonded cyanoalkyl such as cyanopropyl (NC—$C_3H_6$—) or as silicon-bonded cyanoalkoxy such as cyanopropoxy (NC—$C_3H_6$O—).

In the monofunctional siloxy units encompassed by $M_o$ of the polyalkylsiloxane hydrides of the present invention, the respective silicon atoms are bonded to two alkyl groups (R), the third silicon-bonded group being alkyl (R), hydrogen or the aforesaid cyano-bearing ether group (Q). Thus, included within the scope of $M_o$ are monofunctional units having the following unit formulae which, for brevity, are also individually referred to herein as the M, M' and M'' units, as shown:

$M = (R)_3SiO_{1/2}$
$M' = (H)(R)_2SiO_{1/2}$
$M'' = (Q)(R)_2SiO_{1/2}$

In any given polymer composition of the present invention, the $M_o$ units may be the same as or different from one another. In the difunctional siloxy units encompassed by $D_o$, at least one of the two groups bonded to the respective silicon atoms is alkyl and the second silicon-bonded group is R, Q or hydrogen. Thus, included within the scope of $D_o$ are difunctional units having the following unit formulae which, for brevity, are also individually referred to herein as the X, Y and Z° units, as shown:

$X = (R)_2SiO_{2/2}$
$Y = (Q)(R)SiO_{2/2}$
$Z° = (H)(R)SiO_{2/2}$

The cyanoalkoxyalkyl- and cyanoalkoxyalkoxy-substituted polyalkylsiloxane hydrides described herein may contain any combination or subcombination of the respective siloxy units within the scope of $M_o$ and $D_o$ provided an average of from about 2 to about 100 cyano-bearing ether groups (Q) and from about 2 to about 30 silicon-bonded hydrogen atoms are present, as encompassed by the following Formula I:

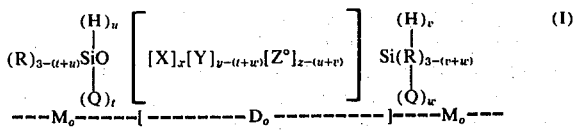

wherein: Q, R, X, Y and Z° have the aforesaid significance; each of $t$, $u$, $v$, $w$, the sum $t+u$ and the sum $v+w$ independently has a value of zero or one; each of the sum $t+w$ and the sum $u+v$ independently has a value of zero, one or two, it being evident that the value of the sum $t+u+v+w$ is also zero, one or two; $x$ is zero or any positive number having an average value up to about 200; $y$ has an average value from about 2 to about 100 ; and $z$ has an average value from about 2 to about 30. It is evident from Formula I that $x$, $y-(t+w)$ and $z-(u+v)$ designate the average number of moles of the respective difunctional X, Y and Z° units which are present for every two moles of total monofunctional units ($M_o$) as shown, and that the values of $y$ and $z$ correspond to the total number of Q groups and hydrogen atoms, respectively, contained in the polymer. Further, when $t+w$ and $u+v$ are zero, $y$ and $z$ also correspond to the respective total number of difunctional Y and Z° units contained in the polymer for every two moles of $M_o$.

The polymers of the invention are useful as wetting agents, anti-static agents, textile finishes and are especially useful in forming a variety of organo-silicone polymers. For example, the cyanoalkoxyalkyl- and cyanoalkoxyalkoxy-substituted polyalkylsiloxane hydrides encompassed by Formula I are reactive with mono-olefinically endblocked and hydroxyl-terminated polyoxy-alkylene ethers to form corresponding cyanoalkoxyalkyl- and cyanoalkoxyalkoxy-substituted polyalkylsiloxane-poly-oxyalkylene copolymers as described in greater detail hereinbelow.

DETAILED DESCRIPTION OF THE INVENTION AND PREFERRED EMBODIMENTS

The functionality of the respective types of structural units encompassed by $M_o$ and $D_o$ of the polymers of this invention denotes the number of oxygen atoms to which the silicon atom (Si) of any particular unit is bonded. Since each oxygen atom is shared by a silicon atom (Si') of another unit, functionality also denotes the number of linkages by which the particular unit can be bonded to another portion of the polymer through —Si—O—Si'— bonds. Accordingly, in expressing the individual formulas of the respective units of the polymers of this invention, fractional subscripts are used in which the value of the numerator defines functionality (i.e., the number of oxygen atoms associated with the silicon atom of the particular unit), and the denominator, which in each instance is 2, denotes that each oxygen atom is shared with another slicon atom. In view of their monofunctionality, the $M_o$ units are chain terminating or endblocking units and the respective oxygen atoms thereof are shared with silicon of one other unit which can be Y or $Z^\circ$ and, when present, X. On the other hand, X, Y and $Z^\circ$ are difunctional and thus the respective two oxygen atoms associated with each silicon atom thereof are shared with respective silicon atoms of other units. Thus, the reoccurring difunctional units may be distributed in the polymer randomly, alternately, as sub-blocks of repeating units of the same type, or in any combination of such arrangements. Further, the polymers of the invention comprise mixtures of polymer species which differ in molecular weight and in the type, arrangement and relative proportions of units. Therefore, as expressed herein, the parameters employed to denote these variables are average values and are based on the relative proportions of reactants from which the various units are derived. It is to be further understood that, consistent with convention in the art to which the present invention pertains, as expressed herein, the formulas of the polymers indicate their overall average empirical composition rather than any particular ordered arrangement of the units or molecular weight of any particular polymer species. With this understanding, the average composition of the respective types of polymers encompassed by Formula I above may be expressed by the following formulae wherein the various siloxy units are shown in chemically combined form:

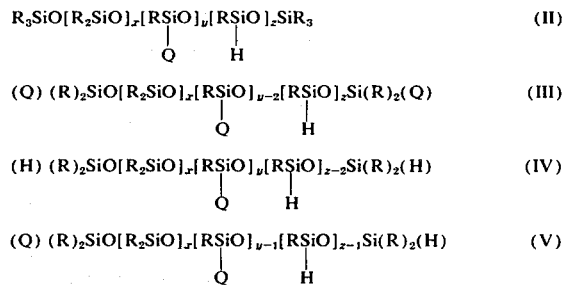

wherein R, Q, x, y and z are as above defined.

The silicon-bonded R groups are alkyls having from one to ten carbon atoms including linear and branched alkyls. Illustrative of suitable groups encompassed by R are: methyl, ethyl, n-propyl, isopropyl, n-butyl, t-butyl, pentyl, hexyl, octyl and decyl. Of the various groups represented by R, the lower alkyls (that is, those having from one to four carbon atoms) are preferred of which methyl is especially suitable. It is to be understood that the R groups may be the same throughout the polymer or they may differ as between or within units without departing from the scope of this invention. For example, when the endblocking monofunctional units are M, that is, $R_3SiO_{1/2}$, they may be trimethylsiloxy units and the difunctional units, $R_2SiO_{2/2}$, when present, may be diethylsiloxy and/or methylethylsiloxy units.

In the Q grouping of the Y and M'' units, that is, in —(O)$_q$R'OR''—CN, R' and R'' are bivalent alkylene radicals of the series, —$C_cH_{2c}$— and —$C_dH_{2d}$— respectively, where c is an integer having a value from 3 to 8 (—R'—) and d is an integer having a value from 2 to 4 (—R''—). Illustrative of suitable groups encompassed by —R''— are ethylene (—$CH_2CH_2$—); trimethylene (—$CH_2CH_2CH_2$—); propylene [—$CH_2CH(CH_3)$—]; and tetramethylene [—$(CH_2)_4$—]. Illustrative of suitable groups encompassed by R' are: trimethylene, propylene, tetramethylene, sec-butylene, hexylene and octylene. The preferred R' groups have from three to four carbon atoms, and may be the same or different from R''. It is to be understood that the polymer may contain any combination of cyanoalkoxyalkyl (NC—R''O—R'—) and/or cyanoalkoxyalkoxy (NC—R''O—R'O—) groups encompassed by Q. For example, the Y units of any particular polymer composition may be one or more of the following: 3-(2-cyanoethoxy)propyl methylsiloxy; 3-(3-cyanopropoxy)propyl methylsiloxy; 3-(2-cyanoethoxy)propoxy methylsiloxy; 3-(2-cyanoethoxy)propyl ethylsiloxy; 3-(2-cyanoethoxy)-2-methylpropyl methylsiloxy; 8-(2-cyanoethoxy)octyl methyl-siloxy; 3-(2-cyano-2-methylethoxy)propyl methylsiloxy; 3-(2-cyano-2-ethylethoxy)propyl methylsiloxy; and the like. Further, when the polymers of the invention contain Q-modified monofunctional units (M''), such units may be 3-(2-cyanoethoxy)propyl dimethylsiloxy; 3-(2-cyanoethoxy)-propoxy dimethylsiloxy; 3-(2-cyanoethoxy)propyl diethylsiloxy; 3-(2-cyanoethoxy)propyl methylethylsiloxy; and the like.

In the polymers described herein, the alkyls (R) are, of course, bonded to silicon by silicon-to-carbon bonds. On the other hand, the respective cyano-bearing ether groups (Q) shown in Formulas I – V may be linked to silicon by Si—C or Si—O bonds, as shown in the following formulas:

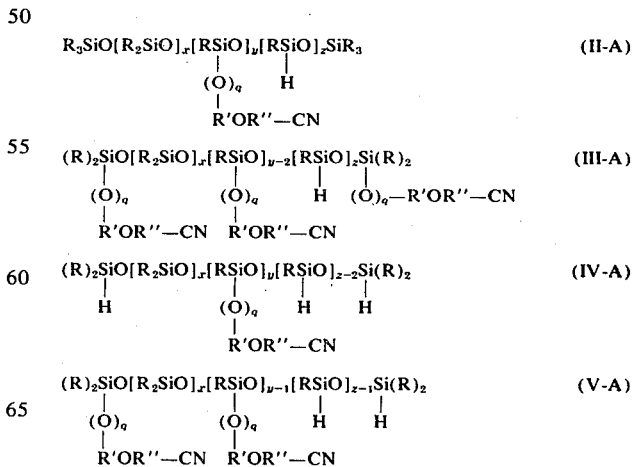

wherein, as previously defined, $q$ is zero or one, and R, R', R'', $x$, $y$ and $z$ are also as previously defined.

The Q-modified polyalkylsiloxane hydrides of the present invention are reactive with monoolefinic polyoxyalkylene ethers to form corresponding Q-modified polyalkylsiloxane-polyoxyalkylene block copolymers. For example, such copolymers wherein the polyoxyalkylene blocks are linked to silicon through Si-C bonds are prepared by the platinum-catalyzed hydrosilation of monoolefinic polyoxyalkylene ethers, employing the Q-modified polyalkylsiloxane hydrides of the present invention as the hydrosilating reactants. This hydrosilation reaction is illustrated by the following equation 1 wherein the Q-modified Si-H reactant is expressed by Formula I-A as shown.

Equation 1

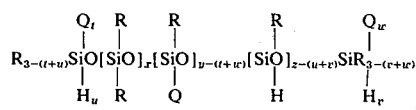

Formula I-A $+ z \; C_eH_{2e-1}(OC_aH_{2a})_bOG \longrightarrow$

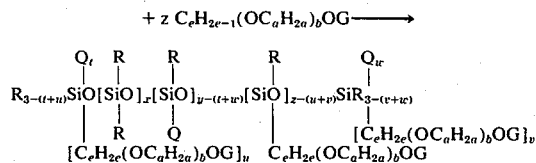

wherein: as previously defined herein, Q is the cyano-bearing ether group, $—(O)_q—R'OR''—CN$, R is alkyl, $t$, $u$, $v$, $w$, $t+u$ and $v+w$ have respective values of zero or one, $t+w$ and $u+v$ have respective values of zeros, one or two, $x$ is zero or a positive number having an average value up to about 200, $y$ has an average value from about 2 to about 100, and $z$ has an average value from about 2 to about 30; $e$ has a value from 2 to 6; and $—(OC_2H_{2a})_bOG$ is organic-capped polyoxyalkylene.

The Q-modified polyalkylsiloxane hydrides of the present invention are also useful in providing corresponding Q-modified polyalkylsiloxane-polyoxyalkylene block copolymers wherein the polyoxyalkylene blocks are linked to silicon through Si—O—C bonds. For example, such copolymers are provided by the catalyzed condensation of the silicon-bonded hydrogen of the hydrides with hydrogen of the -OH group of hydroxyl-terminated polyoxyalkylene reactants as illustrated by the reaction of the following equation 2 in which the hydrides of the present invention are also expressed by Formula I-A shown in above equation 1.

Equation 2 Si—H Reactant of Formula I-A + z
$HO—(C_aH_{2a}O)_bG$

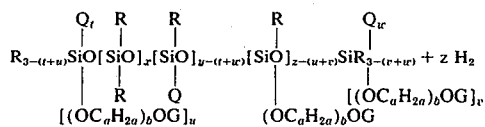

wherein Q, R, $—(OC_aH_{2a})_bOG$, $t$ through $z$, $t+u$, $v+w$, $t+w$ and $u+v$ are as summarized with specific reference to equation 1.

It is evident from equations 1 and 2 that: (1) when $t$, $u$, $v$ and $w$ are zero, the respective Q-modified polyalkylsiloxane hydride reactants (as well as the other copolymer products derived therefrom) are endblocked by M units $[(R)_3SiO_{1/2}]$ as shown in Formulas II and II-A above; (2) when $t$ and $w$ are both one and thus $u$ and $v$ are zero, the endblocking units of the hydrides (as well as the copolymers derived therefrom) are M'' $[(Q)(R)_2SiO_{1/2}]$ as shown in Formulas III and III-A above; (3) when $t$ and $w$ are both zero and $u$ and $v$ are both one, the endblocking units of the Q-modified polyalkylsiloxane hydrides of the invention are M' $[(H)(R)_2SiO_{1/2}]$ as shown in Formulas IV and IV-A above, the corresponding copolymer products having polyether-substituted dialkylsiloxy endblocking units; and (4) when $t$ and $v$ are both one and thus $u$ and $w$ are zero, the Q-modified polyalkylsiloxane hydrides are endblocked by different monofunctional units (M' and M'') and the copolymer products derived therefrom are endblocked by M'' and polyether-substituted dialkylsiloxy units.

When it is desired to utilize the cyanoalkoxyalkyl- and cyanoalkoxyalkoxy-polyalkylsiloxane hydrides of the present invention for the preparation of copolymers which, in turn, offer particular advantage as stabilizers of polyester polyol-based urethane foam, the values of $x$, $y$ and $z$ of Formulas I to V including Formulas I-A to V-A, are as follows: $x$ is zero or a positive number having an average value up to about 20, and usually has an average value no more than about 10; $y$ has an average value from about 2 to about 20, and is usually no more than about 10; and $z$ has an average value, as previously defined, from about 2 to about 30, and is usually no more than about 15. When X units are present, $x$ usually has a value of at least about 0.5, and more usually is at least about one. Further, in applying the reactions of equations 1 and 2 to the preparation of copolymers for use as stabilizers of polyester polyol-based urethane foam, the indicated polyoxyalkylene (or polyether) reactants have a respective polyoxyalkylene content which is constituted of at least 75 weight percent of oxyethylene, the remaining oxyalkylene units usually being oxyethylene and/or oxypropylene. Preferably, the polyether reactants have the respective formulas, $C_eH_{2e-1}(OC_2H_4)_bOG$ and $H-(OC_2H_4)_bOG$, where $e$ has a value from 2 to 6, $b$ has an average value from about 3 to about 30, and G is an organic cap. Suitable organic caps include monovalent hydrocarbon groups ($R^{\infty}—$) having from one to twelve carbon atoms (such as alkyl, aryl and aralkyl groups as illustrated by methyl, ethyl, butyl, phenyl and benzyl) and correspondng $R^{\infty}C(O)—$ and $R^{\infty}NHC(O)—$ groups. Further details concerning such Q-modified polyalkylsiloxane-polyoxyalkylene copolymers and their use as stabilizers of polyester polyol-derived polyurethane foam including flame-retarded foam, are as described in our aforementioned copending application Ser. No. 536,884, filed 12/27/74, entitled "Organosilicone Polymers and Polyester Urethane Foam Produced Therewith," the teachings of which in these respects are incorporated herein as part of the present disclosure by reference thereto.

When it is desired to utilize the cyanoalkoxy-alkyl- and cyanoalkoxyalkoxy-substituted polyalkylsiloxane hydrides of the present invention for the preparation of copolymers which, in turn, offer particular advantage as stabilizers of polyether polyol-based urethane foam, the values of $x$, $y$ and $z$ of Formulas I to V includng Formulas I-A to V-A, are as follows: $x$ has an average value from about 10 to about 200 and usually has an average value from about 20 to about 100; $y$ has an average value from about 2 to about 100 and usually has an average value from about 3 to about 30; and $z$ has an average value from about 2 to about 30 and usually has an average value no more than about 10. Further, in applying the reactions of equations 1 and 2 to the preparation of copolymers for use as stabilizers of polyether polyol-based urethane foam, the indicated polyoxyalkylene or polyether reactants have a respective polyoxyalkylene content which is constituted of between about 20 and about 65 weight percent of oxyethylene, the remaining oxyalkylene content usually being oxypropylene. Preferably, the polyether reactants have the respective formulas, $C_eH_{2e-1}(OC_2H_4)_n(OC_3H_6)_m$ OG and $H(OC_2H_4)_n(OC_3H_6)_m$OG, where $e$ has a value from 2 to 6, G is an organic cap as above-described, and $m$ and $n$ are positive numbers such that the average oxyethylene content of the oxyalkylene chain, —$(OC_2H_4)_n$ $(OC_3H_6)_m$—, ranges from about 20 to about 65 weight percent and the average molecular weight of the chain is from about 1000 to about 6000. Further details concerning such Q-modified polyalkylsiloxane-polyoxyalkylene copolymers and their use as stabilizers of polyether polyol-derived polyurethane foam including flame-retarded foam, are as described in our aforementioned copending application Ser. No. 536,885, filed 12/27/74, entitled, "Organosilicone Polymers and Polyether Urethane Foam Produced Therewith", the teachings of which in these respects are incoporated herein as part of the present disclosure by reference thereto.

The Q-modified polyalkylsiloxane hydrides of the present invention are provided by any one of a number of methods. Overall, the methods comprise the use of various combinations of the precursor reactants described below as the source of the indicated siloxy units or Q groups.

a. Hexaalkyldisiloxanes, $R_3SiOSiR_3$, when the endblocking units are $R_3SiO_{1/2}$, that is, when $t$, $u$, $v$ and $w$ of Formulas I and I-A are zero.

b. Di[cyanoalkoxyalkyl]tetraalkyldisiloxanes, (NC—R"OR')(R)$_2$SiOSi(R)$_2$(R'OR"—CN), when the endblocking units are (NC—R"OR')(R)$_2$SiO$_{1/2}$, that is, when $t$ and $w$ of Formulas I and I-A are both one. Such reactants in turn are prepared by hydrolysis of (NC—R"OR')(R)$_2$SiX° where X° is chlorine or bromine, employing about one mole of water for every two moles of halide.

c. Dihydrogentetraalkyldisiloxanes, (H)(R)$_2$SiOSi(R)$_2$(H), when the endblocking units are (H)(R)$_2$SiO$_{1/2}$, that is, when $u$ and $v$ of Formulas I and I-A are both one.

d. Cyclic dialkylsiloxane polymers, $[R_2SiO]_h$, where $h$ usually has an average value of from about 3 to about 6, as the source of the difunctional dialkylsiloxy units (X), $R_2SiO_{2/2}$, when such X units are to be incoporated, that is, when $x$ of Formulas I and I-A is a positive number.

e. Trialkyl-endblocked dialkylsiloxane polymers, $R_3SiO(R_2SiO)_rSiR_3$, where $r$ has an average value of at least two and is usually no more than about 10, as the source of the endblocking units, $R_3SiO_{1/2}$, and as a source of the dialkylsiloxy units (X), $R_2SiO_{2/2}$, when the latter units are to be incorporated.

f. Cyanoalkoxyalkyl-alkylsiloxane polymers as the source of the

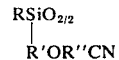

units encompassed by Y where, as previously defined, R' is the bivalent alkylene radical, —$C_cH_{2c}$—, $c$ having a value from 3 to 8 and R" is bivalent alkylene, —$C_dH_{2d}$—, $d$ having a value from 2 to 4. These polymers are formed by the hydrolysis of cyanoalkoxy-alkyldichlorosilanes, NC—R"OR'Si(R)Cl$_2$, followed by the base-catalyzed dehydration-cyclization of the hydrolyzate to form cyclics having the formula [NC—R'λ'OR'—Si(R)O]$_w$, the average value of $w$ being 3 or more.

g. Cyanoalkoxyalkylheptaalkylcyolotetrasiloxanes, [(NC—R"OR')(R)SiO][(R)$_2$SiO]$_3$, as the source of both the X units and the (NC—R"OR )(R)SiO$_{2/2}$ units encompassed by Y. Such cyclics are in turn provided by the platinum-catalyzed hydrosilation reaction between hydrogenhaptaalkylcyclotetrasiloxanes, [(H)(R)SiO][(R)$_2$SiO]$_3$, and the monoolefinic cyanoalkyl ethers defined hereinbelow as reactant ($i$).

h. Polymeric alkylsiloxane hydride fluids having an Si—H content sufficient to provide from about 200 to about 372 cubic centimeters of hydrogen per gram, as the source of the Z° units,

$i$. Monoolefinic cyanoalkyl ethers, $C_cH_{2c-1}OC_dH_2$ CN, wherein $c$ is from 3 to 8 and $d$ is from 2 to 4 as the source of NC—R"OR'— of the NC—R"OR'—Si(R)O$_{2/2}$ units encompassed by Y, wherein R' and R" are more particularly shown as the bivalent alkylene radicals, —$C_cH_{2c}$— and —$C_dH_{2d}$—, respectively.

$j$. Hydroxyalkyl cyanoalkyl ethers, NC—R'λ'OR'—OH, as the source of the NC—R"OR'—O— groups of the NC—R"OR'O—Si(R)O$_{2/2}$ units encompassed by Y, wherein R' and R" are also more particularly expressed as the above defined bivalent alkylene radicals, —$C_cH_{2c}$— and —$C_dH_{2d}$—, respectively.

From Formulas I and I-A it is evident that, when each of $t$, $u$, $v$ and $w$ is zero and Y has the unit formula, (NC—R"OR')(R)SiO$_{2/2}$, the cyanoalkoxyalkyl-substituted Si—H fluids have the average composition expressed by the following Formula I-B wherein R' and R" are expressed as —$C_cH_{2c}$— and $C_dH_{2d}$—, respectively:

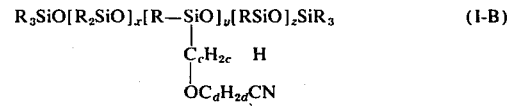

wherein: R as previously defined in alkyl having one to ten carbon atoms and is preferably lower alkyl, methyl being especially preferred; $c$ has a value of 3 to 8; $d$ has a value of 2 to 4; $x$ is zero or any positive number having an average value up to about 200; $y$ has an average value from about 2 to about 100; and $z$ has an average value from about 2 to about 30.

One method for preparing the compositions encompassed by Formula I-B comprises equilibration of various combinations of reactants ($a$) and ($d$)–($h$). Illustrative is the reaction of the following equation 3 which comprises equilibration of reactants (*a*), (*d*) (*f*) and (*h*), and in which polymeric reactants (*d*), (*f*) and (*h*) are shown, for convenience, simply as the siloxy units which they provide to the equilibrated reaction product.

Equation 3

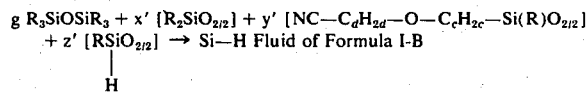

In the above equation 3 and other equations hereinbelow, *g* represents the actual number of moles of the indicated reactant, and *x'*, *y'* and *z'* represent the actual number of moles (or mole-equivalents) of the indicated monomeric units provided by the polymeric source of such units. It is to be understood, therefore, that *g*, *y'* and *z'*, and when X units are present, *x'*, can be any positive numbers depending upon the scale on which the reactions are run, provided that when normalized on the basis of *g*=1 (or two moles of monofunctional units), the average value of the mole ratio *x':y':z'* is within the range of about 0–200:2–100:2–30, respectively, thereby providing Q-modified Si-H fluids wherein the ratio *x:y:z* has a corresponding average value of about 0–200:2–100:2–30, as previously defined.

It is to be understood that in providing the cyanoalkoxyalkyl-modified polyalkylsiloxane hydrides encompassed by Formula I-B in which no X units are present (that is, when *x* is zero), the reaction of equation 3 is effected in the absence of reactant (*d*) whereas when *x* is a positive number, reactant (*d*) is employed. In addition to the reaction of equation 3, the Si-H fluids encompassed by Formula I-B wherein *x* is a positive number, may also be prepared by equilibration of reactants (*e*), (*d*), (*f*) and (*h*) as illustrated by equation 4 below, or by the equilibration of reactants (*a*), (*g*) and (*h*), as illustrated by equation 5.

Equation 4

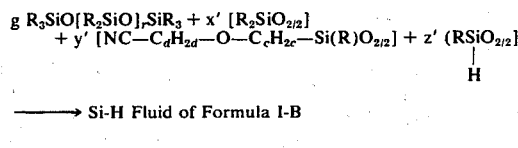

Equation 5

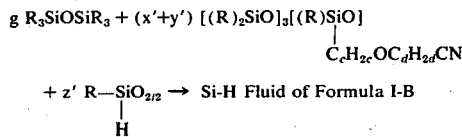

In the cyanoalkoxyalkyl-modified polyalkylsiloxane hydrides produced by the reaction of equation 4, the average number of the $R_2SiO_{2/2}$ units, that is, the value of *x*, corresponds to the value of [*x'*+(*g* × *r*)], normalized on the basis of *g*=1. In the cyanoalkoxyalkyl-modified polyalkylsiloxane hydrides produced by the reaction of equation 5, the ratio of *x:y* will of course be 3:1, corresponding to the ratio of the X and Y units present in reactant (*g*). The ratio of *x:y* may be adjusted to above or below 3:1, as desired, by effecting the reaction of equation 5 in the presence of reactant (*d*) as an additional source of the X units, thereby increasing the ratio above three, or by the employment of an appropriate proportion of reactant (*f*) as an additional source of the Y units, $(NC-R''OR')(R)SiO_{2/2}$, thereby decreasing the ratio to less than three.

With further reference to general Formulas I and I-A, it is evident that when *t* and *w* are both one and Q is cyanoalkoxyalkyl, the Si-H fluids have the average composition depicted by the following Formula I-C in which the cyanoalkoxyalkyl groups are expressed as $NC-C_dH_{2d}-O-C_cH_{2c}-$.

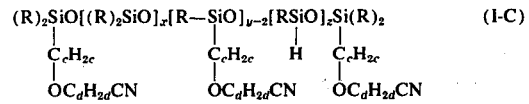

wherein R, *c*, *d*, *x*, *y* and *z* are as previously defined such as is summarized with specific reference to Formula I-B. The Si-H compositions defined by Formula I-C are provided by effecting the equilibration reactions of equations 3–5 in the presence of reactant (*b*) instead of reactants (*a*) and/or (*e*), as illusrated by the following modification of equation 3.

Equation 6

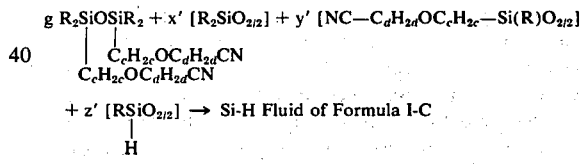

When *y* of Formul I-C is two, it is evident that the cyanoalkoxyalkyl groups are present solely in the end-blocking monofunctional units (M'') and that such compositions are provided by effecting the reaction of equation 6 in the absence of the cyclic source of the Y units, that is, in the absence of reactant (*f*).

With further reference to general Formulas I and I-A, it is evident that when *u* and *v* are both one and Q is cyanoalkoxyalkyl, the Si-H fluids have the average composition depicted by the following Formula I-D in which th cyanoalkoxyalkyl groups are expressed as $NC-C_dH_{2d}-O-C_cH_{2c}-$.

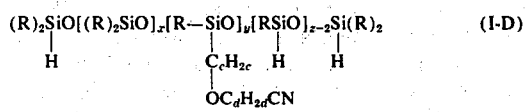

wherein R, *c*, *d*, *x*, *y* and *z* are also as summarized with specific reference to Formula I-B. The Q-modified Si-H compositions defined by Formula I-D are provided by effecting the equilibration reactions of equations 3–5 in the presence of reactant (*c*) instead of reactants (*a*)

and/or (*e*), as illustrated by the following modification of equation 3.

Equation 7

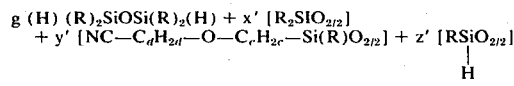

→ Si-H Fluid of Formula I-D

It is evident that when the R groups of each of the reactants shown in equations 3 to 7 is methyl (Me) and, in each instance, *c* has a value of three and *d* has a value of two, the resulting cyanoethoxypropyl-modified polymethylsiloxane hydrides of the invention have the following respective compositions,

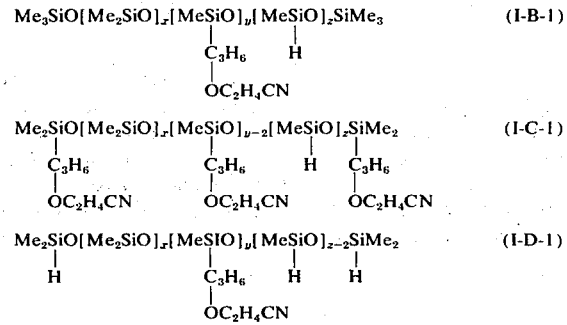

wherein *x*, *y* and *z* are as previously defined herein. The average values of *x*, *y* and *z* in any given polymer composition are predetermined by the relative proportions of reactants employed in its preparation. When the Q-modified Si—H compositions of the present invention are to be employed in the preparation of corresponding poly-oxyalkylene copolymers thereof such as by the reactions of above equations 1 and 2, the equilibration reactions are effected employing relative proportions of reactants at least sufficient to obtain an equilibrated product in which the values of *x*, *y* and *z* correspond substantially to the values desired in the end product, as detailed above with specific reference to the utilization of the hydrides of the invention in providing polyoxyalkylene copolymers for end use application as foam stabilizers of flexible polyester- or polyether-based polyurethane foam.

In providing the Q-modified Si—H fluids by the one-step reactions of equations 3 to 7, standard basecatalyzed equilibration reaction conditions are not suitable in view of the base-senstivity of the Si—H groups. Therefore, the equilibration reactions of equations 3 to 7 are promoted by acid catalysts. Suitable catalysts for this purpose are trifluoromethylsulfonic acid ($CF_3SO_3H$) and concentrated (93–98 weight percent) sulfuric acid. The catalyst is usually employed in a concentration of from about 0.1 to about four weight percent, based on the total weight of reactants. The acid-catalyzed equilibration reactions are usually carried out with vigorous mechanical stirring at temperatures within the range from about 20°C. to about 120°C. at least until the reaction mixture becomes homogeneous. Effecting the reaction at temperatures from about 20° to about 50°C. usually providing a satisfactory rate of reaction. After completion of the reaction, the reaction product is neutralized with base such as sodium bicarbonate and filtered, sometimes adding a liquid hydrocarbon such as xylene or toluene or a filter aid to facilitate the filtration. When a diluent is used, it is conveniently separated from the reaction product by rotary vacuum evaporation.

In addition to the one-step reactions of equations 3 to 7, the cyanoalkoxyalkyl-polyalkylsiloxane hydrides encompassed by general Formulas I and I-A may also be prepared in step-wise manner. For example, the overall reaction of equation 3 may be effected by the following sequence of reactions:

Equation 3*a*

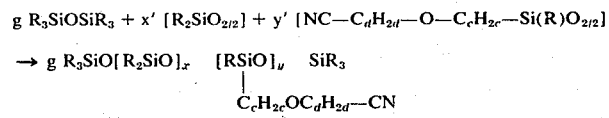

Equation 3*b*

Si—H Fluid of Formula I-B

In view of the fact that Si-H reactant (*h*) is not used in the reaction of equation 3a, it may be effected in the presence of conventional alkaline equilibration catalysts useful in the preparation of unmodified poly-alkylsiloxanes. Illustrative of such alkaline catalysts are potassium silanolate, cesium hydroxide and tetramethyl ammonium silanolate. Such promoters are usually employed in concentrations of from about 30 to about 50 p.p.m., based on the total weight of reactants. The temperature at which the base-catalyzed equilibration reaction of equation 3a is carried out depends largely on the catalyst employed. Thus, when tetramethyl ammonium silanolate is used, suitable reaction temperatures are from about 75°C. to about 100°C., preferably from about 80°–90°C. The other alkaline catalysts usually require higher temperatures such as at least about 150°C. to about 200°C. The further reaction of the product of equation 3a to introduce the

units, as shown by equation 3b, is carried out in the presence of an acid equilibration catalyst as described with specific reference to the reactions of equations 3 to 7.

A third route to the trialkylsiloxy-endblocked cyanoalkoxyalkyl-polyalkylsiloxane hydrides encompassed by Formula I-B comprises the use of the monoolefinic cyanoalkyl ethers described above as reactant (*i*), as the source of the cyanoalkoxyalkyl groups, as illustrated by the following sequence of reactions wherein allyl 2-cyanoethyl ether is shown as the cyano-bearing ether reactant:

Equation 8a

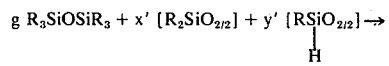

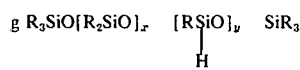

Equation 8b

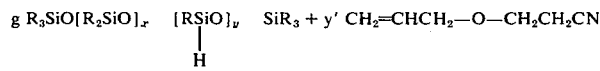

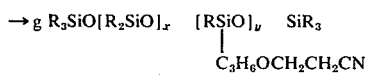

Equation 8c

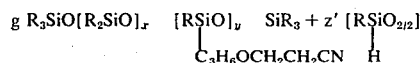

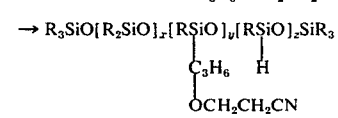

The reaction of equation 8a is effected in the presence of acid equilibration catalysts such as trifluoromethylsulfonic acid and sulfuric acid, at temperatures usually from 20°C. to about 50°C. The reaction of equation 8b is platinum-catalyzed and is effected under the hydrosilation conditions described hereinbelow. The reaction of equation 8c is acid-catalyzed and is carried out under the conditions described with reference to equations 3 to 7, employing an acid equilibration catalyst. Prior to the further reaction of the intermediate fluid provided by equation 8b, it is desirable to separate any unreacted allyl cyanoalkyl ether or isomerized derivatives thereof, in order to minimize any tendency of such compounds to react with the acid catalyst employed in the reaction of equation 8c. It is to be understood that, instead of introducing the

units in two stages (equations 8a and 8c), such units may be introduced during the reaction of equation 8a in a predetermined amount sufficient to provide the total desired amount ($y'+z'$) followed by partial reaction of the Si-H groups with $y'$ moles of the monoolefinic cyanoalkyl ether reactant. This latter embodiment is illustrated by the hydrosilation reaction of the following equation 9.

Equation 9

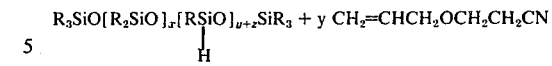

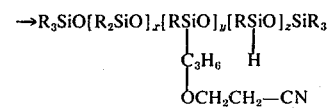

With further reference to general Formulas I and I-A, it is evident that when $t$ through $w$ are zero and Q is cyanoalkoxyalkoxy, the Si-H fluids have the average composition depicted by the following Formula I-E,

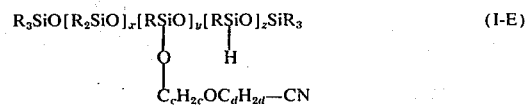

wherein R, $c$, $d$, $x$, $y$, and $z$ are also as summarized with specific reference to Formula I-B. Such Q-modified Si—H fluids are prepared by methods which comprise the condensation of silanic hydrogen and hydrogen of the HO—C groups of the hydroxyalkyl cyanoalkyl ethers, HO—$C_cH_{2c}$—O—$C_dH_{2d}$—CN, described above as reactant (j), as the source of the cyanoalkoxyalkoxy groups. One such method is as illustrated by the reaction of the following equation 10.

Equation 10

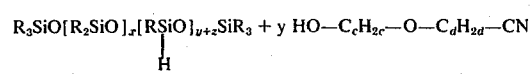

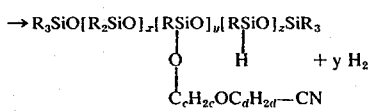

By way of specific illustration, cyanoethoxypropoxy substituted polymethylsiloxane hydrides having the average composition:

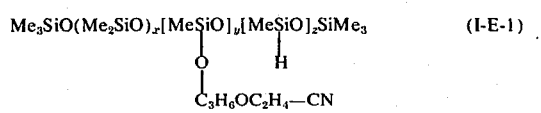

are provided by the reaction of the following equation 10a employing 3-hydroxypropyl 2-cyanoethyl ether as the source of the 3-(2-cyanoethoxy)propoxy groups:

Equation 10a

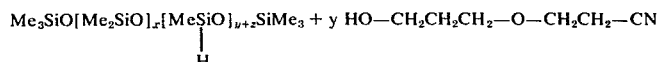

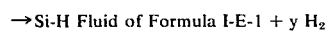

The reactions of equations 10 and 10a are carried out in the presence of metal catalysts, preferably tin carboxylates such as stannous octoate, under the condensation conditions described hereinbelow.

The hydrosilation reactions illustrated by Equations 1, 8b and 9 which overall comprise the addition of Si—H to the respective monoolefinic groups of the polyether reactant (equation 1) and cyano-substituted monoether reaction (equations 8b and 9) are effected in the presence of a platinum catalyst. Particularly effective is platinum in the form of chloroplatinic acid dissolved, if desired, in a solvent such as tetrahydrofuran, ethanol, butanol or mixed solvents such as ethanolethylene glycol dimethyl ether. It is to be understood, however, that other platinum derivatives known to the art as hydrosilation catalysts may also be used such as those prepared by the reaction of chloroplatinic acid and an alcohol (for example, octyl alcohol) in accordance with the method of U.S. Pat. No. 3,220,972. The platinum is present in the hydrosilation reaction mixture in a catalytic amount such as, for example, from about 5 to about 400 parts by weight per million (p.p.m.) parts of the combined weight of the silicon-containing and unsaturated reactants. The more usual platinum concentration is from about 25 to about 300 p.p.m. Suitable reaction temperatures range from about room temperature (20°C.) to about 200°C., and are more usually from about 60°C. to about 160°C.

The condensation reactions illustrated by Equations 2, 10 and 10a which overall comprise the reaction of silanic hydrogen (Si—H) and hydrogen of the —OH groups of the hydroxyl-terminated polyether reactant (equation 2) and the hydroxyalkyl cyanoalkyl ether reactant (equations 10 and 10a), are promoted by a variety of catalysts such as organic derivatives of tin, platinum and other transition metals. Especially suitable are organic derivatives of tin such as tin carboxylates which are typically illustrated by stannous octoate, stannous oleate, stannous laurate and dibutyl tin dilaurate. These catalysts are employed in amounts from about 0.1 to about 5, and usually no more than about 2, weight percent, based on the total weight of the reactants. The Si—H/HO—C condensation reactions are effected at temperatures from about 60°C. to about 150°C., and more usually from about 80°C. to about 120°C.

The hydrosilation and condensation reactions are usually carried out employing the organic reactants (that is, the polyether and cyano-substituted ether) in amounts at least sufficient to react with a predetermined proportion of the silicon-bonded hydrogen of the Si—H reactant. From the standpoint of more effective and more complete reaction of silanic hydrogen, the organic reactants are usually employed in excess of stoichiometric requirements. In those reactions wherein the Si—H groups are to be completely reacted with only one of the organic reactants to form the desired final polymer (equations 1, 2 and 8b), the organic reactant may be employed in amounts up to a 100 or more mole percent excess. In the case of the polyether reactant, however, usually no more than about a 50 mole percent excess is used. On the other hand, when the Si—H reactant is partially reacted initially with one of the organic reactants as shown, for example, by equations 9, 10 and 10a the organic reactants are employed in an amount just sufficient to satisfy the predetermined stoichiometric requirements of the desired reaction or only a small excess such as up to about 50 (e.g., 20 to 30) mole percent is used. With respect to the hydrosilation reactions of equations 8b and 9, it is usually desirable to employ the monoolefinic cyanoalkyl ether reactant in excess of the desired stoichiometric reaction in view of the tendency of such reactants to undergo isomerization and reduction. For example, the allyl 2-cyanoethyl ether reactant shown in equations 8b and 9 can undergo isomerization and reduction in the presence of Si—H and platinum catalyst to form the respective by-products, $CH_3CH=CHOCH_2CH_2CN$ and $CH_3CH_2CH_2OCH_2CN$.

The hydrosilation and condensation reactions may be conducted in the absence or presence of a solvent. Illustrative solvents are any of the following employed individually or in combination with one another: the normally liquid aromatic hydrocarbons such as benzene, toluene and xylene; alcohols such as n-propanol and isopropanol; ethers; ether alcohols; and other such non polar or polar solvents. Upon completion of the respective hydrosilation and condensation reactions, any unreacted monoolefinic cyanoalkyl (including by-products derived therefrom) or hydroxyalkyl cyanoalkyl ether, or any organic solvent employed in the polymer preparation, may be removed by conventional separation techniques, to obtain the final product comprising the polymer compositions of the invention. It is to be understood, however, that some portion or all of the solvent and excess reactants including by-products thereof may remain in the Q-modified polymer product and that such diluted polymer compositions are within the scope and may be used in accordance with the teachings of this invention. In the hydrosilation reactions, the removal or neutralization of the chloroplatinic acid catalyst is usually desirable for long range product stability. Neutralization is readily effected by adding sodium bicarbonate to the reaction mixture followed by filtration of the resultant slurry to remove the neutralizing agent and platinum residues.

The cyanoalkoxyalkyl- and cyanoalkoxyalkoxy-substituted polyalkylsiloxane hydrides of the present invention are normally liquid compositions and, as previously described, comprise mixtures of polymer species which differ in molecular weight and relative number of monomeric units. Generally, the average molecular weight of the Q-modified polyalkylsiloxane hydrides of the present invention ranges from about 625 to about 85,000 (as measured by Gel Permeation Chromatography using a calibration curve based on dimethylsiloxane fluids), and is usually no more than about 50,000. It is to be understood that two or more Si—H fluids which have a particular average composition encompassed by Formula I may be admixed in suitable relative proportions to adjust the average values of $x$, $y$ and $z$, as desired. For example, a Q-modified Si—H composition wherein $y$ has an average value of about 5 may be admixed with about an equimolar proportion of another composition wherein $y$ has an average value of about 2 to provide a resulting composition wherein $y$ has an average value of about 3.5. Similarly, an Si—H fluid encompassed by Formula I in which no $R_2SiO_{2/2}$ units are present (that is, in which $x$ is zero), may be admixed in any relative proportion with a corresponding Si—H fluid in which $x$ is one, thereby providing a product in which the average value of $x$ is less than one (such as, for example, 0.1, 0.5, etc.).

The following examples are offered as illustrative of the present invention and are not intended as a limitation upon the scope thereof.

Molecular weights given in the examples for various polymer compositions of this invention, were measured by Gel Permeation Chromatography (abbreviated in the examples as "G.P.C.") using a calibration curve showing the relationship between the respective elution volumes established for dimethylsiloxane fluids of different molecular weights and the respective known molecular weights of such fluids. In establishing the calibration curve, the various dimethylsiloxane fluids were in solution in trichloroethylene solvent using styragel packed columns. In measuring the molecular weights of the polymers described herein, the elution volume observed for any particular polymer product (in trichloroethylene solvent) was equated with the corresponding elution volume of the calibration curve, and the molecular weight associated with that particular elution volume was assigned as the molecular weight of the polymer product. Gel Permeation Chromatography as a technique for measuring molecular weight is discussed in "Polymer Fractionation" (ed. Manfred J. R. Cantow, Academic Press, Inc. New York 1967), pages 123–173, Chapter B4, entitled "Gel Permeation Chromatography," by K. H. Altgelt and J. C. Moore. In determining the molecular weights given in the examples, the particular procedure employed was that described in the article entitled "Characterization of Silicones by Gel Permeation Chromatography" by F. Rodriguez et al. in *I & EC Product and Development*, Vol. 5, No. 2, page 121 (June 1966) using five styragel packed columns (Waters Associates, Inc.) having a pore size of $10^3 A°$, $3 \times 10^3 A°$, $10^4 A°$, $3 \times 10^4 A°$, and $8 \times 10^3 A°$, respectively.

It is to be understood that in the formulas included in the data which follows, "Me" designates a methyl group, —$CH_3$.

EXAMPLE 1

PREPARATION OF Q-MODIFIED Si—H FLUID I

In a 500 ml. capacity 3-necked reaction flask fitted with a mantle, stirrer, thermometer, addition funnel, condenser and nitrogen valves, there were combined 36.7 grams of an equilibrated polymethylsiloxane hydride having the average composition, $Me_3SiO[Me(H)SiO]_{12}SiMe_3$, and 100 ml. of toluene. In the addition funnel were placed 34.7 grams of allyl 2-cyanoethyl ether, $CH_2$=$CHCH_2OCH_2CH_2CN$, corresponding to about 10 mole percent in excess of the desired stoichiometric reaction which was to react 7/12 of the silanic hydrogen of the polymethylsiloxane hydride reactant with the ether. After heating the contents of the flask to 95°C., 0.2 ml. of platinum catalyst (prepared by reacting chloroplatinic acid with octyl alcohol as described in U.S. Pat. No. 3,220,972) was added and the addition of the allyl 2-cyanoethyl ether begun. There was a smooth exotherm to 105°C. with addition being completed in 25 minutes at 90°–105°C. After an additional 1.5 hours at 90°C., the reaction product was cooled, treated with one weight percent sodium bicarbonate and 0.5 weight percent of filter aid (Hyflo Super-Cel) and activated charcoal (Darco G-60), followed by pressure filtration and vacuum distillation. The distillate (6.7 grams) boiled up to 37°C./0.7 mm. mercury pressure, and consisted mainly of isomerized and reduced derivatives of the allyl 2-cyanoethyl ether reactant. The residual liquid product (60.2 grams) had a Brookfield viscosity of 236 centipoise and an average molecular weight of 2200 as determined by Gel Permeation Chromatography (G.P.C.). Upon analysis for Si—H content, the product provided 85.8 cc. $H_2$/gram. Based upon the aforesaid desired stoichiometric reaction, the liquid product which is referred to herein as Q-modified Si—H Fluid I, is assigned the following average composition,

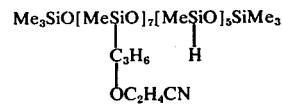

EXAMPLE 2

PREPARATION OF Q-MODIFIED Si-H FLUID II

Following substantially the same procedure and applying the hydrosilation reaction conditions described under Example 1, 49.4 grams of an equilibrated polymethyl-siloxane hydride having the average composition, $Me_3SiO[Me_2SiO]_2[Me(H)SiO]_8SiMe_3$, was reacted with 22.2 grams of allyl 2-cyanoethyl ether. The desired stoichiometric reaction was to react 3/8 of the silanic hydrogen of the Si—H reactant with the ether. Work-up of the reaction mixture as described in Example 1 provided 7.0 grams of distillate, and 57.3 grams of residual liquid product. The latter product had a Brookfield viscosity of 55 centipoise and an average molecular weight (G.P.C.) of 1480. Upon analysis for Si—H content, the product provided 103 cc. $H_2$/gram. Based upon the aforesaid desired stoichiometric reaction, the liquid product which is referred to herein as Q-modified Si—H Fluid II, is assigned the average composition,

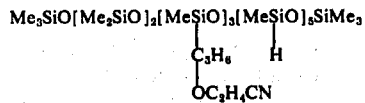

The following Examples 3 and 4 demonstrate the usefulness of the Q-modified polyalkylsiloxane hydrides of the invention in forming correspondng Q-modified poly-alkylsiloxane-polyoxyalkylene block copolymers and the effectiveness of such copolymers as stabilizers of poly-ester polyol-based urethane foam. The illustrative copolymers are referred to as Surfactants A and B and were prepared as described in respective Examples 3 and 4.

EXAMPLE 3

PREPARATION OF SURFACTANT A

In a 200 ml. reaction vessel fitted with a mantle, stirrer, thermometer, addition funnel, condenser and nitrogen blow-by, there were combined: 26.1 grams of above-described Q-modified Si—H Fluid I; 57.0 grams of a methyl-capped, allyl alcohol-started polyoxyethylene ether having the average composition, $CH_2$=$CHCH_2(OC_2H_4)_8OMe$; and 60 ml. of toluene.

After heating the reaction mixture to 95°C., there was then added 0.3 ml. of platinum catalyst prepared by the reaction of chloroplatinic acid and octyl alcohol. After 1.5 hours of heating at 95°–100°C., residual Si—H remained constant at 0.4 cc. $H_2$ per 0.5 ml. sample. The reaction product was cooled, treated with sodium bicarbonate, filter aid and charcoal, and was then pressure filtered and vacuum stripped. The liquid reaction product (73.5 grams), designated herein as Surfactant A, had a viscosity of 325 centipoise, an average molecular weight (G.P.C.) of 3400, and is assigned the average composition,

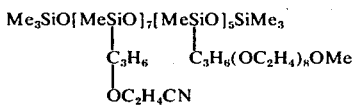

Surfactant A is an effective stabilizer of flame-retraded, flexible polyester polyol urethane foam. By way of illustration, Surfactant A was employed as the surfactant or foam stabilizing component of a foam-producing reaction mixture, referred to herein as Foam Formulation A, the components of which are as identified in the following Table I.

TABLE I

| FOAM FORMULATION A | |
|---|---|
| Component | Parts By Weight |
| Surfactant A | 0.35 |
| Polyester Polyol (1) | 100.0 |
| N-ethylmorpholine | 1.9 |
| Hexadecyldimethylamine | 0.3 |
| Water | 3.6 |
| Tolylene diisocyanate (Index 105) (2) | 45.2 |
| Tris(2-chloroethyl)phosphate | 7.0 |

(1) The polyester polyol employed was that marketed as "Wilmar Polyester 180" (Wilson-Martin Division of Wilson Pharmaceutical & Chemical Corporation). This polyester polyol has a hydroxyl number of 49–55, a typical viscosity at 25°C. (Brookfield LVF) of 19,000–23,000 centipoise and an acid number not greater than 2.0.
(2) This component was a mixture of 2,4-tolylene diisocyanate (80 weight percent) and 2,6-tolylene diisocyanate. Index 105 means that the amount of mixture employed was 105 percent of the stoichiometric amount required to react with the polyol and water present in the foam formulation.

The results of this foam preparation include a foam rise of 5.4 inches, and a breathability of 0.7 standard cubic feet per minute (SCFM), as determined by the NOPCO breathability test procedure described by R. E. Jones and G. Fesman, "Journal of Cellular Plastics" (January, 1965). The burning extent and burning time taken to give the specified burning extent were also measured in accordance with standard flammability test procedure ASTM D–1692–68 except that five test specimens of foam were used instead of ten. The results of this test are: burning extent = 1 inch and burning time = 26.7 seconds.

EXAMPLE 4

PREPARATION OF SURFACTANT B

The copolymer of this example was prepared and worked-up as described under Example 3 employing: 21.7 grams of Q-modified Si—H Fluid II; 57.0 grams of the same polyoxyethylene ether; and 60 ml. of toluene. The liquid reaction product (71.5 grams), referred to herein as Surfactnat B, had a viscosity of 162.5 centipoise, an average molecular weight (G.P.C.) of 2700, and is assigned the following average composition,

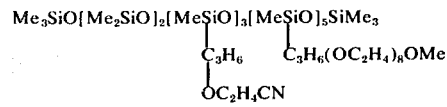

Surfactant B is also an effective stabilizer of flame-retarded, flexible polyester polyol urethane foam. For example, when Surfactant B was employed as the foam stabilizing component of Foam Formulation A (Table I) in place of Surfactant A, the foam rise and properties were as follows: foam rise = 5.5 inches; foam breathability = 0.6 SCFM; burning extent = one inch; and burning time = 28.1 seconds.

In accordance with the following Examples 5 and 6, further illustrative Q-modified polyalkylsiloxane hydrides of the invention were prepared by the equilibration of reaction mixtures containing the following reactants as the source of the indicated units:

Reactant (1): Hexamethyldisiloxane, $Me_3SiOSiMe_3$, as the source of the endblocking trimethylsiloxy units, $Me_3SiO_{1/2}$—.

Reactant (2): Cyclic polymers of dimethylsiloxane distilled to provide the cyclic tetramer, $[Me_2SiO]_4$, as a source of the dimethylsiloxy units.

Reactant (3): 3-(2-cyanoethoxy)propylheptamethyl-cyclotetrasiloxane,

as the source of the 3-(2-cyanoethoxy)propyl methylsiloxy units and as an additional source of the dimethylsiloxy units. Illustrative of the manner in which this reactant was prepared is as follows: The cyclic tetramer, [$(Me)_2SiO]_3[(Me)$ $(Me)(H)SiO]$, in an amount of 250 grams was heated to 60°C. followed by the addition thereto of 0.3 ml. of platinum catalyst solution prepared by the reaction of chloroplatinic acid with octyl alcohol. Further heating to 90°C. was followed by the addition of 97.3 grams of allyl 2-cyanoethyl ether over a period of 15 minutes. The reaction temperature maintained itself at about 100°–127°C. The reaction mixture was treated with sodium bicarbonate, filter aid and charcoal, and was then filtered and vacuum distilled (vacuum stripping is also suitable) to provide the correspondng 3-(2-cyanoethoxy)propyl-modified cyclic tetramer having a boiling point of 110°–112°C. at 3.0 mm. mercury pressure.

Reactant (4): Polymeric methylhydrogensiloxane, as the source of the $Me(H)SiO_{2/2}$ units.

EXAMPLE 5

PREPARATION OF Q-MODIFIED Si-H FLUID III

A reaction mixture was prepared containing the aforesaid Reactants (1)–(4) in the following amounts:

Reactant (1): 1.14 grams, corresponding to 0.014 mole of the unit, $Me_3SiO_{1/2}$;

Reactant (2): 15.54 grams, corresponding to 0.21 mole of the unit, $Me_2SiO_{2/2}$;

Reactant (3): 27.6 grams, corresponding to 0.21 mole of the unit, $Me_2SiO_{2/2}$, and 0.07 mole of the unit, $(NC-C_2H_4O-C_3H_6)(Me)SiO_{2/2}$; and Reactant (4): 2.52 grams, corresponding to 0.042 mole of the unit, $Me(H)SiO_{2/2}$.

Also added was concentrated (98 percent) sulfuric acid in a total amount of about 1.5 grams. The reaction mixture was stirred at room temperature for about 22 hours. The equilibrated reaction product was neutralized with excess sodium bicarbonate, treated with filter aid (Hyflo Super-Cel) and charcoal (Darco G-60), followed by pressure filtration and vacuum stripping of toluene which had been added during filtration. The residual liquid product (32.7 grams) had a Brookfield viscosity of 270 centipoise and an average molecular weight of 8600 as determined by Gel Permeation Chromatography (G.P.C.). Upon analysis for Si—H content, the product provided 20.2 cc. $H_2$/gram. Based upon the proportions of reactants employed, normalized to two moles of $Me_3SiO_{1/2}$ endblocking units, the average composition of the equilibrated liquid product is expressed as follows,

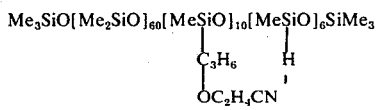

This product is referred to herein as Q-modified Si-H Fluid III.

EXAMPLE 6

PREPARATION OF Q-MODIFIED Si-H FLUID IV

A reaction mixture was prepared containing the aforesaid Reactants (1)–(4) in the following amounts:

Reactant (1): 0.8 grams, corresponding to about 0.01 mole of the unit, $Me_3SiO_{1/2}$;

Reactant (2): 10.4 grams, corresponding to 0.14 mole of the unit, $Me_2SiO_{2/2}$;

Reactant (3): 27.6 grams, corresponding to 0.21 mole of the unit, $Me_2SiO_{2/2}$, and 0.07 mole of the unit, $(NC-C_2H_4O-C_3H_6)(Me)SiO_{2/2}$; and Reactant (4): 2.3 grams, corresponding to about 0.04 mole of the unit, $Me(H)SiO_{2/2}$. The reaction mixture was stirred at room temperature for about 22 hours in the presence of about 1.5 grams of concentrated sulfuric acid. The equilibrated product was then neutralized with excess sodium bicarbonate, treated with filter aid and charcoal, followed by pressure filtration and vacuum stripping of toluene which had been added during filtration. The residual liquid product (23.6 grams) had a Brookfield viscosity of 400 centipoise and an average molecular weight of 11,000 (G.P.C.). Upon analysis for Si—H content, the product provided 21.3 cc. $H_2$/gram. Based upon the proportions of reactants employed, normalized to two moles of $Me_3SiO_{1/2}$ endblocking units, the average composition of the equilibrated liquid product is as follows,

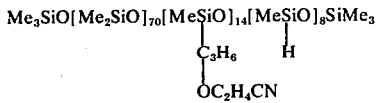

This product is referred to herein as Q-modified Si—H Fluid IV.

The following Examples 7 and 8 demonstrate the usefulness of the Q-modified polyalkylsiloxane hydrides of the invention in forming corresponding Q-modified polyalkylsiloxane-polyoxyalkylene block copolymers and the effectiveness of such copolymers as stabilizers of polyether polyol-based urethane foam. The illustrative copolymers are referred to as Surfactants C and D and were prepared as described in Examples 7 and 8, respectively.

EXAMPLE 7

PREPARATION OF SURFACTANT C

In a 250 ml. reaction vessel fitted with a mechanical stirrer, thermometer, condenser and nitrogen blow-by, there were combined: 20 grams of above-described Q-modified Si—H Fluid III; 67.3 grams of a methyl-capped, allyl alcohol-started poly(oxyethylene-oxypropylene) ether having the average composition, $CH_2=CHCH_2(OC_2H_4)_{24.9}(OC_3H_6)_{25.6}OMe$; and 40 grams of toluene. After heating the reaction mixture to 84°C., there was then added 0.3 ml. of platinum catalyst prepared by the reaction of chloroplatinic acid and octyl alcohol as described in U.S. Pat. No. 3,220,972. After about 15 minutes of heating at 84°–86°C., residual Si—H was less than 0.1 cc. $H_2$ per 0.5 ml. sample. The reaction product was cooled, treated with sodium bicarbonate, filter aid and charcoal, and was then pressure filtered and vacuum stripped. The liquid reaction product designated herein as Surfactant C, had a viscosity of 2100 centipoise, an average molecular weight of 25,000 (G.P.C.), and is assigned the following average compositio, composition,

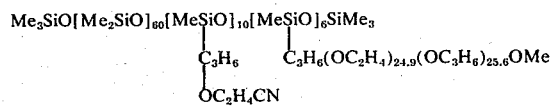

Surfactant C is an effective stabilizer of flame-retarded, flexible polyether polyol urethane foam. By way of illustration, Surfactant C was employed as the foam stabilizing component of a water-blown, foam-producing reaction mixture, referred to herein as Foam Formulation B, the components of which are as identified in the following Table II.

TABLE II

| FOAM FORMULATION B | |
|---|---|
| Components | Parts By Weight |
| Polyether Polyol having a Hydroxyl Number of about 46 produced by reacting glycerol, propylene oxide and ethylene oxide. | 100 |
| Tolylene Diisocyanate (Index 105) (1) | 48.4 |
| Water | 4 |
| Bis[2-(N,N-dimethylamino)ethyl] ether employed as a 70 weight percent solution of dipropylene glycol | 0.1 |
| Stannous Octoate | 0.25 |
| Tris(2,3-dichloropropyl)phosphate | 12.5 |
| Surfactant C | 0.6 |

(1) As identified in footnote (2) of Table I.

Breathability and flammability measurements of the foam product were determined by the aforementioned tests. The results are: foam rise = 7.0 inches; foam breathability = 3.4 SCFM; burning extent = 2.0 inches; and burning time = 41.1 seconds.

EXAMPLE 8

PREPARATION OF SURFACTANT D

The copolymer of this example was prepared and worked-up substantially as described under Example 7 employing: 15 grams of Q-modified Si-H Fluid IV; 53.5 grams of the same poly(oxyethylene-oxypropylene) ether reactant; and 40 grams of toluene. The liquid reaction product which is referred to herein as Surfactant D, had a viscosity of 2300 centipoise, an average molecular weight of 33,000 (G.P.C.), and is assigned the following average composition,

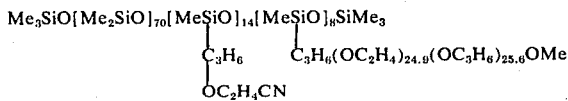

Surfactant D is also an effective stabilizer of flameretarded, flexible polyether polyol urethane foam. For example, when Surfactant D was employed as the foam stabilizing component of Foam Formulation B (Table II) in place of Surfactant C, the foam rise and properties were as follows: foam rise = 7.0 inches; foam breathability = 2.6 SCFM; burning extent = 1.8 inches; and burning time = 38.3 seconds.

In the following Examples 9 and 10, further illustrative Q-modified polyalkylsiloxane hydrides were prepared by the hydrosilation of allyl 2-cyanoethyl ether with polymethylsiloxane hydrides having the average composition:

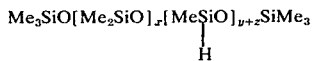

wherein the sum $y+z$ corresponds to the combined number of Y and Z° units desired in the final composition for every two moles of M units. The respective examples also include data demonstrating the utility of the Q-modified products in forming polyoxyalkylene copolymers thereof.

EXAMPLE 9

PREPARATION OF Q-MODIFIED Si-H FLUID V

To a one-liter capacity three-necked flask fitted with a mechanical stirrer, water cooled condenser, and source of nitrogen, the following reactants and catalyst were added:

1. Trimethylsiloxy-endblocked dimethylsiloxy trimer, $Me_3SiO(Me_2SiO)_3SiMe_3$ in an amount of 19.2 grams, corresponding to 0.1 mole of $Me_3SiO_{1/2}$ and 0.15 mole of $Me_2SiO_{2/2}$;

2. Polymeric methylsiloxy hydride in an amount of 75.0 grams, corresponding to 1.25 moles of $Me(H)SiO_{2/2}$;

3. Cyclic dimethylsiloxane tetramer in an amount of 210.9 grams, corresponding to 2.85 moles of $Me_2SiO_{2/2}$; and 4. Trifluoromethylsulfonic acid catalyst in an amount corresponding to 0.2 weight percent, based on the total weight of reactants (1)–(3).

After two hours of stirring under nitrogen, the reaction mixture was homogeneous. The equilibration reaction was stirred for an additional five hours and was then neutralized with 50 grams of sodium bicarbonate, heated to 130°C., sparged with nitrogen, cooled and filtered. Based upon the relative proportions of reactants (1)–(3), normalized to two moles of $Me_3SiO_{1/2}$, the nominal composition of the resulting liquid polymethylsiloxane hydride is, $Me_3SiO[Me_2SiO]_{60}[Me(H)SiO]_{25}SiMe_3$, and the theoretical weight percent of Me(H)SiO is 24.58. Analysis of the product for silanic hydrogen provided 88.09 cc. $H_2$/gram, corresponding to a found Me(H)SiO content of 23.6 weight percent. Based upon the Si-H analysis, the average composition of the product is: $Me_3SiO[Me_2SiO]_{60}[Me(H)SiO]_{2.4}SiMe_3$. This polymethylsiloxane hydride (30.21 grams, 0.119 moles Me(H)SiO) was reacted with allyl 2-cyanoethyl ether (10.0 grams, 0.090 moles) in xylene solvent (50 grams) in the presence of 10 p.p.m. Pt catalyst added as chloroplatinic acid at a temperature of 80°C. for about one hour. The resultant liquid 3-(2-cyanoethoxy)propyl-modified poly-methylsiloxane hydride has the average composition,

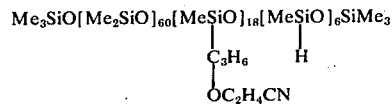

and is referred to herein as Q-modified Si—H Fluid V. This product was then combined with a polyether reactant having the average composition, $MeO(C_3H_6O)_{28.1}(C_2H_4O)_{26.9}CH_2CH=CH_2$ (110 grams, 0.0381 mole, the stoichiometric amount being 0.029 moles). The mixture was heated to about 90°C. and while at that temperature 10 p.p.m. of Pt catalyst as chloroplatinic acid was added. The reaction mixture was heated at 95°C. until essentially complete as indicated by a residual Si-H content (standard fermentation tube technique involving the use of KOH—$C_2H_5OH$—$H_2O$) of 0.2 cc. $H_2$ per 2 ml. sample of product. The reaction mixture was cooled to room temperature, neutralized with sodium bicarbonate, filtered and stripped of solvent by rotary vacuum evaporation (about 50°C./5mm.). The liquid reaction product had a Brookfield viscosity (at 25°C.) of 1200 centipoise, and is designated herein as Surfactant E. Based upon the relative proportions of the equilibrated polymethylsiloxane hydride, allyl cyanoethyl ether and stoichiometric amount of the polyether reactant, Surfactant E comprises a polymer having the average composition,

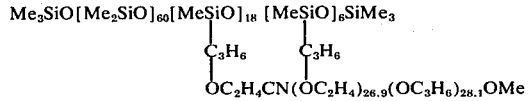

Surfactant E is an effective stabilizer of polyether polyolbased urethane foam. For example, Surfactant E was employed as the foam stabilizing component of Foam Formulation C which is identified in the following Table III.

TABLE III

| FOAM FORMULATION C | |
|---|---|
| Component | Parts by Weight |
| Polyether Polyol having a hydroxyl number of 56 produced by reacting glycerol and propylene oxide | 100 |
| Tolylene Diisocyanate (Index 105) (1) | 49.73 |
| Tris(2-chloroethyl)phosphate | 10 |
| Water | 4 |
| Bis[2-(N,N-dimethylamino)ethyl] ether employed as a 70 weight percent solution in dipropylene glycol | 0.1 |
| Stannous Octoate | 0.35 |
| Surfactant E | 1.0 |

(1) As defined in footnote (2) of Table I.

The results of this foam preparation are: foam rise = 7.3 inches; breathability = 6.1 SCFM; burning extent = 3 inches; and burning time = 48 seconds.

EXAMPLE 10

PREPARATION OF Q-MODIFIED Si-H FLUID VI

The equilibration reaction and procedure described under Example 9 was repeated employing reactants (1) and (2) as well as the trifluoromethylsulfonic acid catalyst in the same amounts, and reactant (3) in an amount of 173.9 grams corresponding to 2.35 moles of $Me_2SiO_{2/2}$. Based upon the relative proportions of reactants (1)–(3), normalized on the basis of two moles of $Me_3SiO_{1/2}$, the nominal average composition of the resulting liquid polymethylsiloxane hydride is, $Me_3SiO[Me_2SiO]_{50}[Me(H)SiO]_{25}SiMe_3$, and the theoretical weight percent of Me(H)SiO is 27.97. Analysis of the product for silanic hydrogen provided 100.04 cc. $H_2$/gram, corresponding to a found Me(H)SiO content of 26.8 weight percent. Based upon the Si-H analysis, the average composition of the product is: $Me_3SiO[Me_2SiO]_{50}[Me(H)SiO]_{24}SiMe_3$. This polymethyl-siloxane hydride (26.81 grams, 0.1198 moles MeHSiO) was reacted with allyl 2-cyanoethyl ether (9.99 grams, 0.0898 moles) in xylene solvent (50 grams) in the presence of 10 p.p.m. Pt catalyst and under the hydrosilation reaction conditions described under Example 9. The resultant liquid 3-(2-cyanoethoxy)propyl-modified polymethylsiloxane hydride has the average composition,

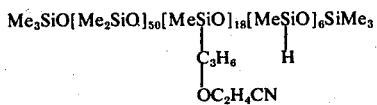

and is referred to herein as Q-modified Si-H Fluid VI. This product was then combined with the polyether reactant (114 grams, 0.0394 mole) described under Example 9, the stoichiometric amount of polyether reactant required to react with said Q-modified Si-H Fluid VI being about 0.030 mole. The platinum-catalyzed hydrosilation of the polyether reactant was effected under the reaction conditions described in Example 9, until the residual Si-H content of the mixture was 0.3 cc. $H_2$/1 cc. of product. After being similarly neutralized and stripped of solvent, the liquid reaction product had a Brookfield viscosity (at 25°C.) of 1080 centipoise, and is designated herein as Surfactant F. Based upon the relative proportions of the polymethylsiloxane hydride, allyl cyanoethyl ether and stoichiometric amount of the polyether reactant, Surfactant F comprises a polymer having the average composition,

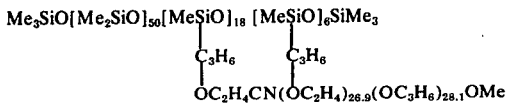

Surfactant F is also an effective stabilizer of polyether polyol-based urethane foam. For example, when Surfactant F was employed as the foam stabilizing component of Foam Formulation C in place of Surfactant E, the following results were obtained: foam rise = 7.1 inches; foam breathability = 6.0 SCFM; burning extent = 2.4 inches; and burning time = 40 seconds.

What is claimed is:

1. As a novel composition, a cyano-ether poly-alkylsiloxane hydride which comprises monofunctional siloxy units and difunctional siloxy units, an average of between about 2 and about 100 silicon-bonded cyano-bearing ether groups for every two moles of monofunctional units, said cyano-bearing ether groups having the formula, $-(O)_qR'OR''CN$, wherein $q$ is zero or one, R' is bivalent alkylene of 3 to 8 carbon atoms and R'' is bivalent alkylene of 2 to 4 carbon atoms, and an average of between about 2 and about 30 silicon-bonded hydrogen atoms for every two moles of monofunctional units, said monofunctional units having at least two alkyls bonded to the respective silicon atoms thereof and the difunctional units having at least one alkyl bonded to the respective silicon atoms thereof, the remaining group bonded to silicon of the respective monofunctional and difunctional siloxy units being alkyl, said cyano-bearing ether group or hydrogen.

2. A cyano-ether substituted polyalkylsiloxane hydride having an average composition within the formula,

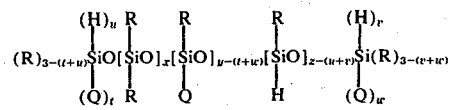

wherein:

R is alkyl having from one to 10 carbon atoms;

Q is a cyano-bearing ether group having the formula, $-(O)_qR'OR''CN$, where $q$ is zero or one, R' is bivalent alkylene having from 3 to 8 carbon atoms and R'' is bivalent alkylene of 2 to 4 carbon atoms;

$t, u, v, w$, the sum $t+u$ and the sum $v+w$ are independently zero or one, and each of the sums $t+w$ and $u+v$ is independently zero, one or two;

$x$ is zero or a positive number having an average value up to about 200;

$y$ has an average value from about 2 to about 100; and $z$ has an average value from about 2 to about 30.

3. A composition as defined in claim 2 in which R has from one to four carbon atoms.

4. A composition as defined in claim 3 in which R is methyl.

5. A composition as defined in claim 2 in which $q$ of said cyano-bearing ether group is zero.

6. A composition as defined in claim 5 in which said cyano-bearing ether group is 3-(2-cyanoethoxy)propyl.

7. A composition as defined in claim 2 in which $q$ of said cyano-bearing ether group is one.

8. A composition as defined in claim 7 in which said cyano-bearing ether group is 3-(2-cyanoethoxy)-propoxy.

9. A composition as defined in claim 2 in which each of $u$ and $v$ is one.

10. A composition as defined in claim 2 in which each of $t$ and $w$ is one.

11. A composition as defined in claim 2 in which each of $t, u, v$ and $w$ is zero.

12. A composition as defined in claim 2 in which $x$ is zero.

13. A composition as defined in claim 2 in which $x$ is a positive number.

14. A cyano-ether substituted polyalkylsiloxane hydride having an average composition within the formula,

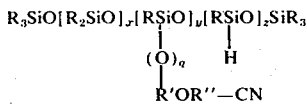

wherein: R is alkyl having from 1 to 10 carbon atoms; R' is bivalent alkylene of from 3 to 8 carbon atoms; R" is bivalent alkylene of from 2 to 4 carbon atoms; $q$ is zero or one; $x$ is zero or a positive number having an average value up to about 200; $y$ has an average value from about 2 to about 100; and $z$ has an average value from about 2 to about 30.

15. A composition as defined in claim 14 in which R' has from 3 to 4 carbon atoms.

16. A composition as defined in claim 14 in which R" has two carbon atoms.

17. A composition as defined in claim 14 in which —R'OR"—CN is 3-(2-cyanoethoxy)propyl.

18. A composition as defined in claim 14 in which $x$ is zero.

19. A composition as defined in claim 14 in which $x$ is a positive number.

20. As a novel composition, a cyano-bearing polyalkylsiloxane hydride having the average composition,

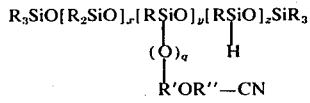

wherein: R is alkyl having from one to four carbon atoms; R' is bivalent alkylene of 3 to 8 carbon atoms; R" is bivalent alkylene of 2 to 4 carbon atoms; $q$ is zero or one; $x$ is zero or a positive number having an average value up to about 20; $y$ has an average value from about 2 to about 20; and $z$ has an average value from about 2 to about 30.

21. A composition as defined in claim 20 in which R is methyl.

22. As a novel composition, a cyano-bearing polyalkylsiloxane hydride having the average composition,

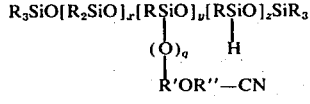

wherein: R is alkyl having from one to four carbon atoms; R' is bivalent alkylene of from 3 to 8 carbon atoms; R" is bivalent alkylene of from 2 to 4 carbon atoms; $q$ is zero or one; $x$ has an average value from about 10 to about 200; $y$ has an average value from about 2 to about 100; and $z$ has an average value from about 2 to about 30.

23. A composition as defined in claim 22 in which R is methyl.

24. A cyanoethoxypropyl-substituted polymethylsiloxane hydride having the average composition,

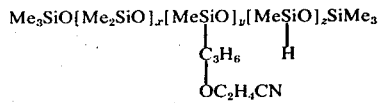

wherein: Me is methyl; $x$ is zero or a positive number having an average value up to about 200; $y$ has an average value from about 2 to about 100; and $z$ has an average value from about 2 to about 30.

25. A composition as defined in claim 24 in which $x$ has an average value no more than about 20 and $y$ has an average value no more than about 20.

26. A composition as defined in claim 24 in which $x$ has an average value no more than about 10, $y$ has an average value no more than about 10, and $z$ has an average value no more than about 15.

27. A composition as defined in claim 24 in which $x$ has an average value of at least about 10.

28. A composition as defined in claim 24 in which $x$ has an average value from about 20 to about 100, $y$ has an average value from about 3 to about 30, and $z$ has an average value no more than about 10.

29. A cyanoethoxypropoxy-substituted polymethylsiloxane hydride having the average composition,

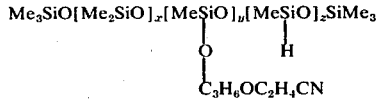

wherein: Me is methyl; $x$ is zero or a positive number having an average value up to about 200; $y$ has an average value from about 2 to about 100; and $z$ has an average value from about 2 to about 30.

* * * * *

UNITED STATES PATENT OFFICE
CERTIFICATE OF CORRECTION

Patent No. 3,943,156　　　　　　　Dated March 9, 1976

Inventor(s) Bela Prokai and Bernard Kanner

It is certified that error appears in the above-identified patent and that said Letters Patent are hereby corrected as shown below:

Column 2, lines 31-35, that portion of the formula reading

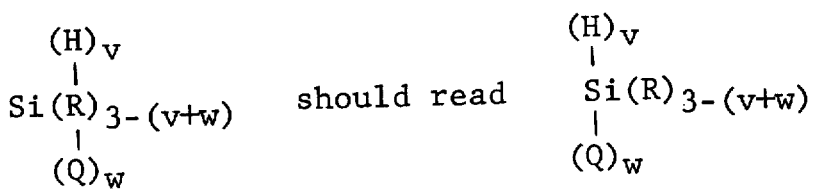

Column 3, line 19, for "slicon" read -- silicon --. Column 4, line 23, after "same" read -- as --. Column 5, lines 19-22, the formula should read

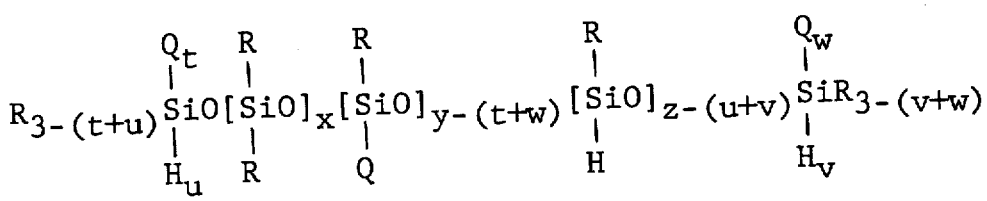

Column 5, lines 29-33, the formula should read

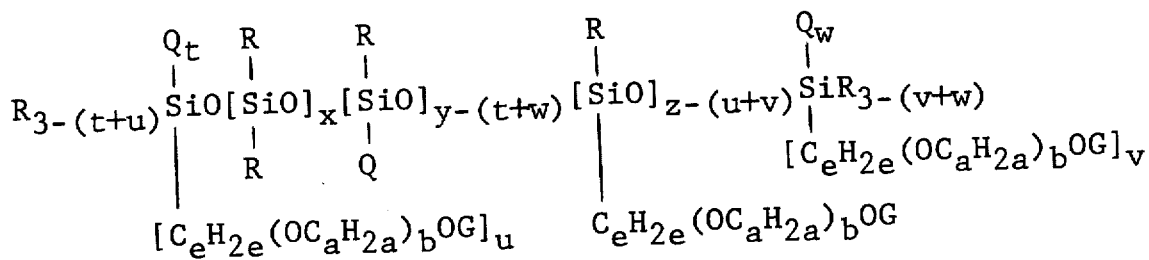

UNITED STATES PATENT OFFICE
CERTIFICATE OF CORRECTION

Patent No. 3,943,156      Dated March 9, 1976

Inventor(s) Bela Prokai and Bernard Kanner

It is certified that error appears in the above-identified patent and that said Letters Patent are hereby corrected as shown below:

Column 5, lines 60-64, the formula should read

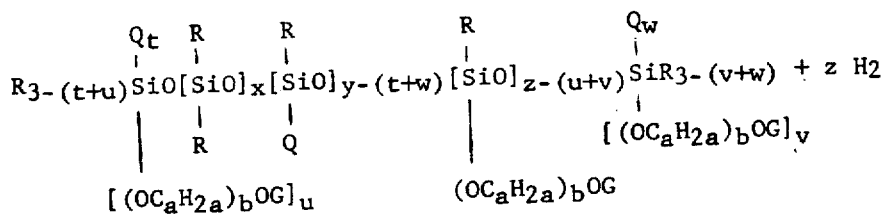

Column 6, line 68, for "includng" read -- including --. Column 8, lines 13-14, the formula bridging these two lines should read

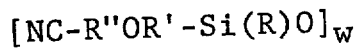

Column 8, line 16, that portion of the named compounds reading "cyol" should read -- cyclo --; line 18, that portion of the formula reading $$R"OR \quad \text{should read} \quad R"OR'$$

Column 8, lines 39-40, the formula bridging these two lines should read -- NC-R"OR'-OH --; lines 54-56, that portion of the formula reading

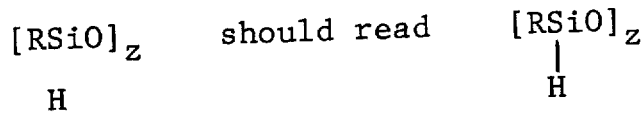

Column 10, line 34, for "illusrated" read -- illustrated --;

UNITED STATES PATENT OFFICE
CERTIFICATE OF CORRECTION

Patent No. 3,943,156  Dated March 9, 1976

Inventor(s) Bela Prokai and Bernard Kanner

It is certified that error appears in the above-identified patent and that said Letters Patent are hereby corrected as shown below:

line 46, for "Formul" read -- Formula --; line 56, for "th" read -- the --. Column 11, line 6, in the first line of Equation 7, $$[R_2SIO_{2/2}] \quad \text{should read} \quad [R_2SiO_{2/2}]$$

Column 12, line 3, for "providing" read -- provides --; Equation 3a, in the second line thereof, for the subscripts "x" and "y", read -- x' -- and -- y' --, respectively.  Column 13, Equation 8a, in the second line thereof, for the subscripts "x" and "y", read -- x' -- and -- y' --, respectively; Equation 8b, in the first and second lines thereof, in each occurrence, for the subscripts "x" and "y", read -- x' -- and -- y' --, respectively; Equation 8c, in the first line thereof, for the subscripts "x" and "y", read -- x' -- and -- y' --, respectively
Column 15, line 9, for "reaction" read -- reactant --.
Column 16, line 25, after "cyanoalkyl" read -- ether --.
Column 19, line 20, for "retraded" read -- retarded --; line 66, for "Surfactnat" read -- Surfactant --.

UNITED STATES PATENT OFFICE
CERTIFICATE OF CORRECTION

Patent No. 3,943,156      Dated March 9, 1976

Inventor(s) Bela Prokai and Bernard Kanner

It is certified that error appears in the above-identified patent and that said Letters Patent are hereby corrected as shown below:

Column 20, line 37, that portion of the formula reading

[(Me)(Me)(H)SiO] should read [(Me(H)SiO]

Column 21, lines 18-21, that portion of the formula reading $$\begin{matrix} Si \\ | \\ H \\ | \end{matrix} \quad \text{should read} \quad \begin{matrix} Si \\ | \\ H \end{matrix}$$

Column 22, line 26, before "composition," delete "compositio,".

Signed and Sealed this

*nineteenth* Day of *July 1977*

[SEAL]

Attest:

RUTH C. MASON
*Attesting Officer*

C. MARSHALL DANN
*Commissioner of Patents and Trademarks*